(12) United States Patent
Aoki (10) Patent No.: US 7,948,660 B2
(45) Date of Patent: May 24, 2011

(54) ELECTRONIC MAIL RECEIVING DEVICE AND FACSIMILE MACHINE

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 2903 days.

(21) Appl. No.: 10/253,662

(22) Filed: Sep. 25, 2002

(65) Prior Publication Data

US 2003/0063323 A1    Apr. 3, 2003

(30) Foreign Application Priority Data

Sep. 28, 2001 (JP) ................................ 2001-301457

(51) Int. Cl.
*H04N 1/00* (2006.01)
(52) U.S. Cl. ....... 358/402; 358/1.15; 358/403; 358/407; 358/442; 358/408; 709/206; 709/232
(58) Field of Classification Search .................. 358/402, 358/1.15, 403, 407
See application file for complete search history.

(56) References Cited

U.S. PATENT DOCUMENTS

| | | | | |
|---|---|---|---|---|
| 5,513,126 A * | 4/1996 | Harkins et al. | ................. | 709/228 |
| 6,061,502 A * | 5/2000 | Ho et al. | ...................... | 358/1.15 |
| 6,160,631 A | 12/2000 | Okimoto et al. | | |
| 6,333,791 B1 | 12/2001 | Okimoto et al. | | |
| 6,785,018 B2 * | 8/2004 | Wakabayashi | ............... | 358/1.15 |

FOREIGN PATENT DOCUMENTS

| | | |
|---|---|---|
| JP | A 10-320330 | 12/1998 |
| JP | A-11-41401 | 2/1999 |
| JP | A-11-127285 | 5/1999 |
| JP | A-2001-125850 | 5/2001 |

OTHER PUBLICATIONS

Foreign Office Action mailed Jun. 18, 2010 in Japanese Application No. 2001-301457 (with translation).

* cited by examiner

*Primary Examiner* — David K Moore
*Assistant Examiner* — Quang N Vo
(74) *Attorney, Agent, or Firm* — Oliff & Berridge, PLC

(57) ABSTRACT

A facsimile machine including an electronic mail receiving device, a condition data setting portion sets various condition data related to output of electronic mail (e-mail) message and stores the set condition data into an EEPROM. The condition data is used when an output method and an output timing of the e-mail message are specified based on contents of the e-mail message. The condition data can be set by a user using an operation inputting portion to meet user's needs. Next, an output condition determining portion compares the e-mail message received at a mail receiving portion, with the set condition data, to specify an output method according to the condition data.

20 Claims, 8 Drawing Sheets

| PRIORITY | OUTPUT TIMING | OUTPUT PASSWORD | CONDITION DETERMINATION TARGET | CONDITION VALUE | OUTPUT METHOD |
|---|---|---|---|---|---|
| 1 | ON RECEIVING | - | X-ReadMethod | -(*) | - |
| 2 | ON RECEIVING | - | SENDER | kaisha | PRINTING |
| 3 | ON OPERATED | - | ADDRESS | tousan | DISPLAYING ON LCD |
| 4 | ON RECEIVING | 1234 | ADDRESS | kaasan | OUTPUTTING BY VOICE |
| 5 | ON RECEIVING | - | ADDRESS | baasan | PRINTING |
| 6 | ON RECEIVING | - | ADDRESS | musuko | TRANSFERRING TO zzz@zzz.ne.jp |
| 255 | ON OPERATED | - | - | - | DISPLAYING ON LCD |

ELECTRONIC MAIL RECEIVING DEVICE AND FACSIMILE MACHINE

BACKGROUND OF THE INVENTION

1. Field of Invention

The invention relates to an electronic mail receiving device that outputs received electronic mail messages in various ways and a facsimile machine including the electronic mail receiving device.

2. Description of Related Art

Information has been busily exchanged among personal computers via external networks, such as the Internet, by transmitting and receiving electronic mail (e-mail). Particularly, in recent years, familiar devices other than personal computers, such as cellular phones, facsimile machines and terminals for mailing, can transmit and receive e-mail. Accordingly, the transmitting/receiving of the e-mail using such familiar devices is rapidly becoming popular.

In the above-described devices, that can transmit and receive e-mail (hereinafter, referred to as a mailing terminal), when a received e-mail message is output, the most popular outputting method is to display the e-mail message on a display device, such as an LCD (liquid crystal display device). However, when a contrast of the display device is low or a screen of the display device is small, it may be difficult to read the characters displayed on the display device. Therefore, in most instances, the e-mail message is printed out on a sheet of paper to overcome the difficulty in reading attributed to the structure or performance of the display device.

In recent years, a technology for converting text data into voice signals and outputting the signals by voice has been in practical use. Using this technology, a user can listen to a voice to learn the contents of a received e-mail message that is output by voice. As described above, as methods of ways, to learn the contents of the received e-mail messages, there are three methods, namely, a method of reading the message displayed on a display, a method of reading the message printed on a sheet, and a method of listening to the message outputted by voice.

These output methods each have drawbacks and advantages. The most suitable output method varies from person to person. For example, for a user whose eye condition is good and who is accustomed to operating electronic equipment, the best way might be to display an e-mail message on a screen and read the message by scrolling as necessary. In addition, this method does not require use of other resources, such as paper, so that this method is friendly to the environment.

It would be convenient if a user could know the contents of an e-mail message while working on another thing, i.e., when the user is tied up by the other work and cannot leave the work for a while. For example, for a user (e.g. homemaker) who is busy with his/her house work, it would be convenient if the contents of the e-mail message is output by voice because the user could learn the contents of the e-mail message without stopping doing household chores. For elderly people, it would be convenient if an e-mail message is printed out because the printout is easier to read than the message displayed on a display and it is also easier to understand the contents than when the message is output by voice.

When each user has his/her own mailing terminal as described above, the user selects and uses his/her own mailing terminal in a manner suitable to the user's preference or needs from the mailing terminals having any one of the output methods. However, for example, when a fixed phone device or a facsimile machine is shared between several users, it is necessary for each user to specify a desirable output method every time each user outputs his/her e-mail messages.

It is assumed that a family shares a facsimile machine to transmit and receive e-mail messages. Generally, there is at least one person who is accustomed to the use of electronic equipment and another person who is unaccustomed to the use of the electronic equipment. Therefore, it is often the case that it is difficult for the person unfamiliar with the use of the electronic equipment to output received e-mail messages in an output method suitable for him/her. Further, it is burdensome to specify a desirable output method every time for even the person familiar with the use of the electronic equipment.

SUMMARY OF THE INVENTION

The invention provides an electronic mail receiving device that can output a received electronic mail message in a plurality of output methods according to requests of one or a plurality of users without an output method being specified by the user every time the output is performed.

According to one aspect of the invention, an electronic mail receiving device receives an electronic mail message transmitted to an address specified by a sender, via a communication line, and can output the received electronic mail message by at least two output units. In the electronic receiving device, an output condition setting unit sets an output condition to specify one of the output units, which output the received electronic mail message, in accordance with a command issued from outside. An output method specifying unit that determines whether the received electronic mail data includes data corresponding to the output condition, and specifies the output unit, which outputs the electronic mail message, according to the output condition, when the electronic mail message includes the data corresponding to the output condition. An output control unit that outputs the received electronic mail message by the output unit specified by the output method specifying unit.

That is, in accordance with the data included in the electronic mail message, the output unit, which outputs the received electronic mail message, is automatically specified. For the specification of the output unit, the output condition (which specifies specific data in the received electronic mail message and an appropriate output unit with respect to the specific information) is set in advance by a command from outside, for example, by an input operation by the user. When the data set as the output condition is included in the electronic mail message, the set data and the output condition are compared with each other, and the output unit is specified according to the set data.

Therefore, according to the electronic mail receiving device, the output condition can be set in advance by the user to specify appropriate output units in accordance with received electronic mail messages. Further, when the received electronic mail message is output, the output is performed by the output unit according to the set condition. Accordingly, the electronic mail messages can be output in a method suitable for user requests without the output method being specified every time the output is performed.

BRIEF DESCRIPTION OF THE DRAWINGS

An exemplary embodiment of the invention will be described in detail with reference to the following figures wherein.

DETAILED DESCRIPTION OF PREFERRED EMBODIMENTS

Figure 1:
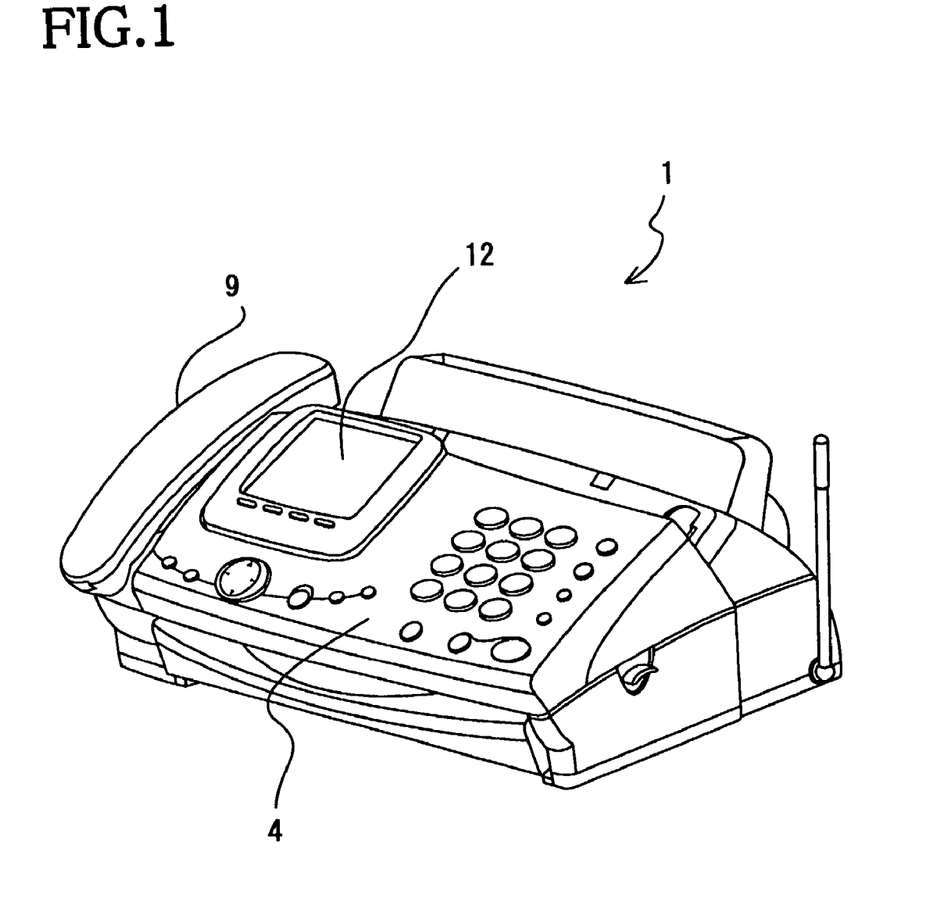
FIG. 1 is a perspective view showing an appearance of a facsimile machine, to which the invention is applied.
Figure 2:
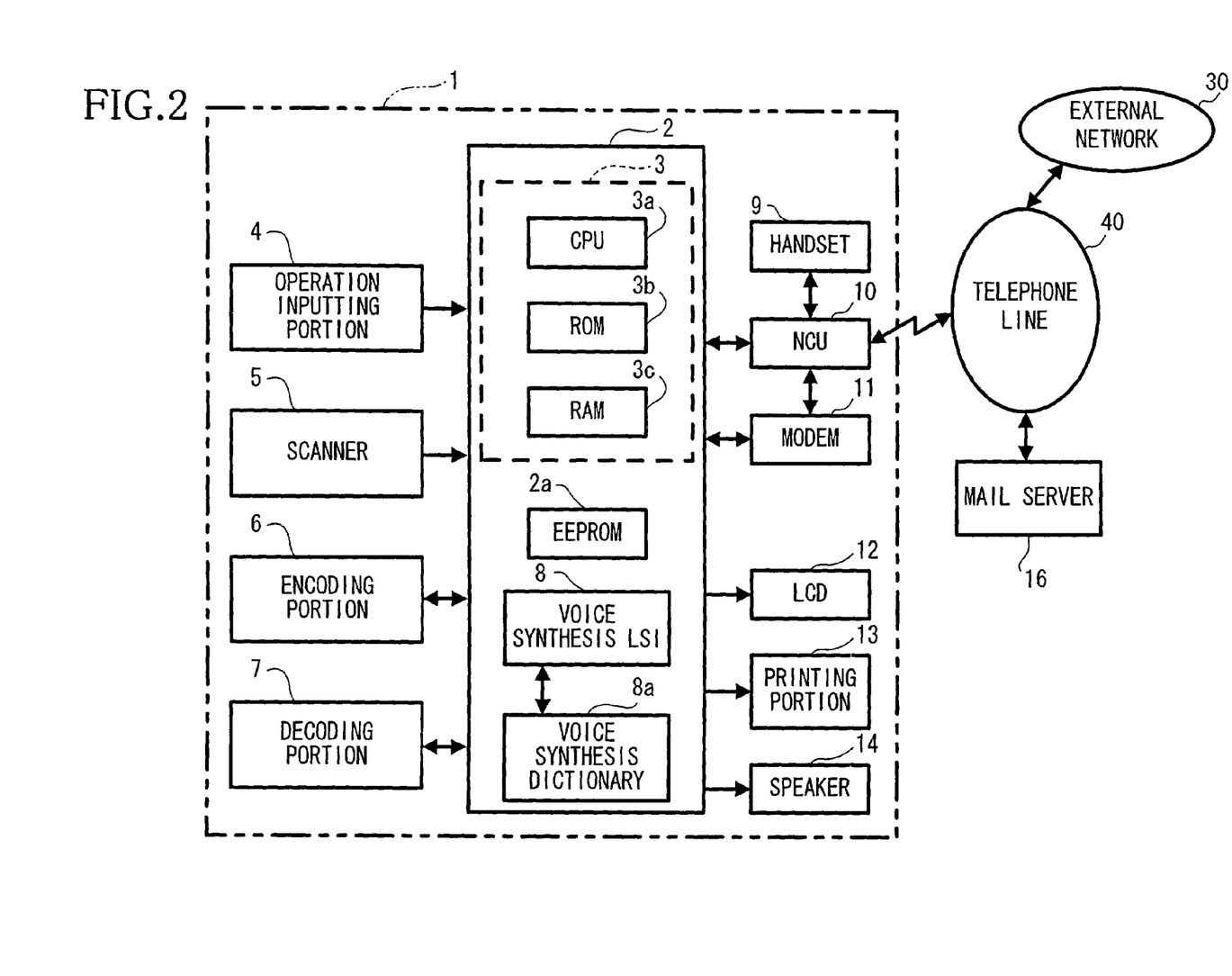
FIG. 2 is a block diagram schematically showing a facsimile machine of an embodiment of the invention.

An exemplary embodiment of the invention will be described below with reference to the accompanying drawings. A facsimile machine 1 of the embodiment of the invention is a multifunction facsimile machine that includes a phone function, a copy function, and an electronic mail (e-mail) transmitting/receiving function as well as basic functions (for example, transmitting/receiving and printing of image data) as a facsimile machine. As shown in FIGS. 1 and 2, the facsimile machine 1 includes a controller 2, an operation inputting portion 4, a scanner 5, an encoding portion 6, a decoding portion 7, a handset 9, a NCU (network control unit) 10, a modem 11, a LCD (liquid crystal display) 12, a printing portion, or unit, 13 and a speaker 14.

A main unit of the controller 2 is a well-known microcomputer 3 that includes a CPU 3a, a ROM 3b and a RAM 3c. The CPU 3a executes various control processing including mail processing (described later) related to the output of incoming e-mail messages. The ROM 3b stores the various control processing to be executed by the CPU 3a. The RAM 3c allocates a workspace where the CPU 3a executes the control processing, and an area for a so-called mail box to store e-mail messages that have been transmitted or received. In this embodiment, a battery is built into the facsimile machine 1, in addition to power to be supplied from the outside of the facsimile machine 1. Accordingly, even when external power is not supplied to the facsimile machine 1, internal power (the battery) is supplied to the facsimile machine 1 and the contents of the RAM 3c are not erased.

The controller 2 includes an EEPROM 2a, which is a well-known nonvolatile memory which can be electrically erased and rewritten. The EEPROM 2a stores various data, such as telephone numbers, and various condition data (described later) entered by a user using the operation inputting portion 4.

The controller 2 also includes a voice synthesis LSI 8 that converts a received e-mail message into voice signals. When a received e-mail message is specified to be outputted by voice, attaching the condition data thereto, the e-mail message (text data) is captured by the voice synthesis LSI 8. Then, the voice synthesis LSI 8 converts the text data into voice signals with reference to a voice synthesis dictionary 8a, which stores, for example, standard voice data by syllable. The voice signals generated by the voice synthesis LSI 8 are amplified as necessary and input to a speaker 14. Thus, the e-mail message is output by voice.

The operation inputting portion 4 has various keys (e.g. push buttons) that are used by the user to enter items, such as telephone numbers and facsimile numbers, to communicate with external networks 30 and also enter condition data and passwords. The scanner 5 scans a document, as image data, to transmit the document and/or make a copy of the document by the facsimile machine 1. The encoding portion 6 encodes the image data scanned by the scanner 5 into a data format appropriate for facsimile transmission, for example, a format of data compressed by the G3 compression technology. The decoding portion 7 decodes the compressed image data received by the facsimile machine 1 into data that that can be output by the printing unit 13.

The handset 9 is used to communicate with another party through a telephone line 40 by taking the handset 9 off-hook when the user makes a call through the telephone line 40 and/or answers the phone. The NCU 10 and the modem 11 are provided to communicate, transmit and receive facsimile data (image data) and e-mail among the external networks 30 through the telephone line 40. The modem 11 modulates outgoing facsimile data (image data) and e-mail data and outputs the modulated data to the telephone line 40. Further, the modem 11 demodulates incoming facsimile data and e-mail data.

In the embodiment, e-mail messages are transmitted and received via a mail server 16 owned by a provider, such as an Internet service provider (ISP), with which the user has a contract, in the same manner as the transmitting and receiving of mail by a personal computer. The external networks 30, which will be not described in detail, can be various networks, such as LANs connected via the telephone lines 40 (e.g. a LAN provided in an office and a small-scale LAN provided in a home, in which a plurality of terminals are connected with each other to make a network), facsimile machines and personal computers directly connected via the telephone lines 40 (e.g. public phone networks and IDSNs) to transmit and receive image data. The mail server 16 is also considered one of the components constituting the external networks 30.

The LCD 12 displays telephone numbers and facsimile numbers entered via the operation inputting portion 4, menu screens for selecting various functions, various messages and images received via the facsimile machine 1. In addition, the LCD 12 displays received e-mail messages and a condition data input screen for requesting an input of condition data to be included in e-mail messages from the user.

The printing unit 13 prints out facsimile data received from outside sources and image data of documents scanned by the scanner 5, on a recording sheet. In addition, the printing unit 13 prints out received e-mail messages in the embodiment.

The speaker 14 notifies the user of receipt of incoming calls and/or e-mail messages and outputs voice from a caller by voice during a call. Further, in the embodiment, when the received e-mail messages are converted into voice signals by the voice synthesis LSI 8, the speaker 14 outputs the voice signals by voice. That is, the voice synthesis LSI 8 and the speaker constitute a voice output unit of the invention.

Hereinafter, an explanation will be made, assuming that the facsimile machine 1 is shared among a family of five (father, mother, son, daughter, grandmother) and each of them has a private e-mail address. The mail box allocation in the RAM 3c includes five mail boxes. Specifically, the allocation comprises a father's mail box (a user ID is "tousan"), a mother's mail box (a user ID is "kaasan"), a son's mail box (a user ID is "musuko"), a daughter's mail box (a user ID is "musume"), and a grandmother's mail box (a user ID is "baasan"). The user ID is referred to as information indicated at the left side of an "at" symbol (@) in each of the e-mail addresses.

In the facsimile machine 1 of the embodiment, as described above, the CPU 3a executes the various control processing to implement the various functions of the telephone and facsimile machines, and also executes various mail processing to output received e-mail messages in accordance with a user's preferences or a sender's intents.

Figure 3:
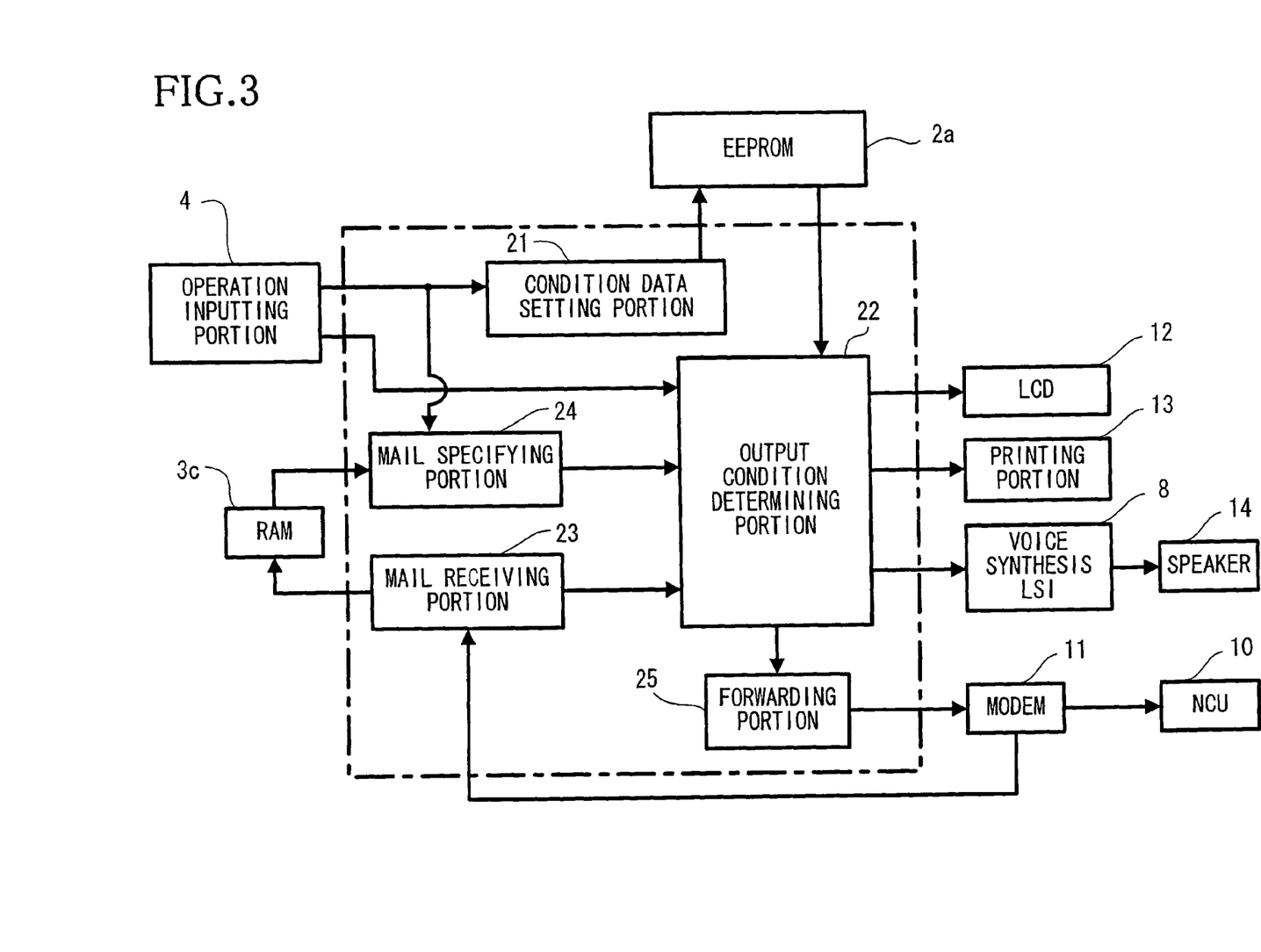
FIG. 3 is a block diagram functionally showing each processing (e-mail processing) to be executed by a CPU.

The mail processing of the embodiment includes condition data setting processing, mail output control processing on receiving, and mail output control processing on operation. The condition data setting processing is a process for setting, as condition data, an output condition for specifying an output method for a received e-mail message (that is, the received message is displayed on the LCD 12, printed by the printing unit 13, output by voice through the speaker 14, or transferred to a predetermined address) and an output timing when the e-mail message is output using the specified output method. The mail output control processing on receipt is a process to output an e-mail message in accordance with the set condition data upon receipt of the e-mail message. The mail output control processing on operation is a process to output an e-mail message in accordance with the condition data when the user directly performs an operation (issues a command to output the e-mail message) using the operation inputting portion 4. FIG. 3 functionally shows the above-described processing to be executed by the CPU 3a.

Figure 4:
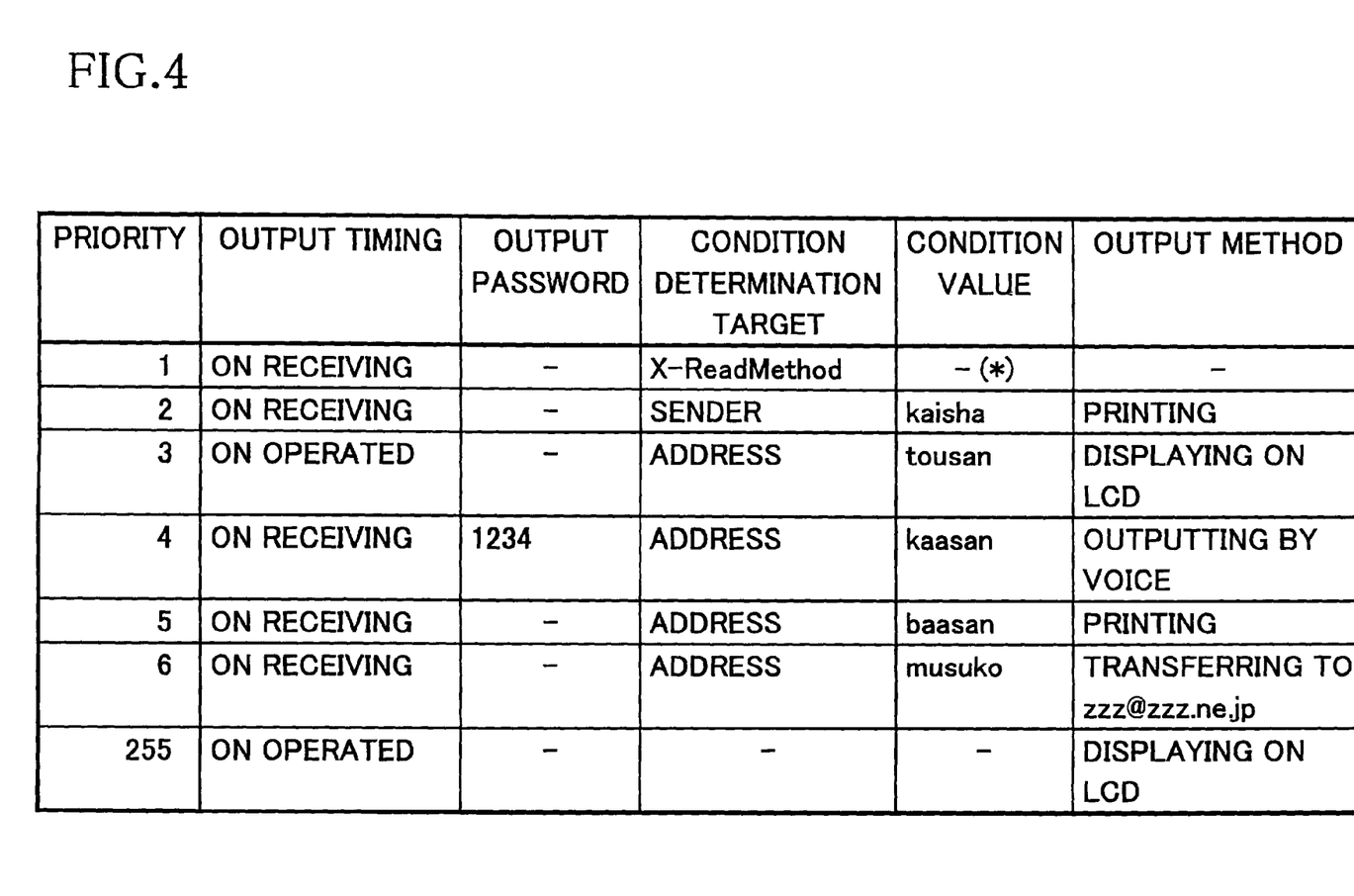
FIG. 4 is an explanatory diagram showing an example of condition data to be set in a condition data setting portion.

That is, in the e-mail processing executed by the CPU 3a, first, a condition data setting portion 21 sets condition data for the output of e-mail messages, in accordance with requests entered by the user via the operation inputting portion 4. Particularly, as shown in FIG. 4, a condition determination target, a condition value, and an output method are specified as an output condition. The condition determination target shows a target item that is included in a received e-mail message and referred to when the determination is performed as to whether the e-mail message satisfies the conditions based on data included in the received e-mail message. The condition value specifically shows the condition determination target. The output method shows a way to output the e-mail message when the condition determination target matches the specified condition value.

Further, an output timing and an output password can be specified as a condition according to the output condition. The output timing specifies a timing at which an e-mail message is actually output. When the output password is assigned to the e-mail message, an input of the output password is required to output the e-mail message.

In the embodiment, the condition determination target includes output method specifying data (X-ReadMethod), sender's data and address data. The output method specifying data is specified by a sender to specify an output method for outputting the e-mail message for a recipient. The sender's data indicates who is the sender of the e-mail message, and the address data specifies a destination of the e-mail message. These data are included in the e-mail message. As the output method specifying data, any one of four output methods, namely, "Voice" (outputting the message by voice through the speaker 14), "View" (displaying the message on the LCD 12), "Print" (printing out the message by the printing unit 13) and "Forward: [mail address]" (transferring the message to a predetermined address) can be specified by the sender.

Figure 5:
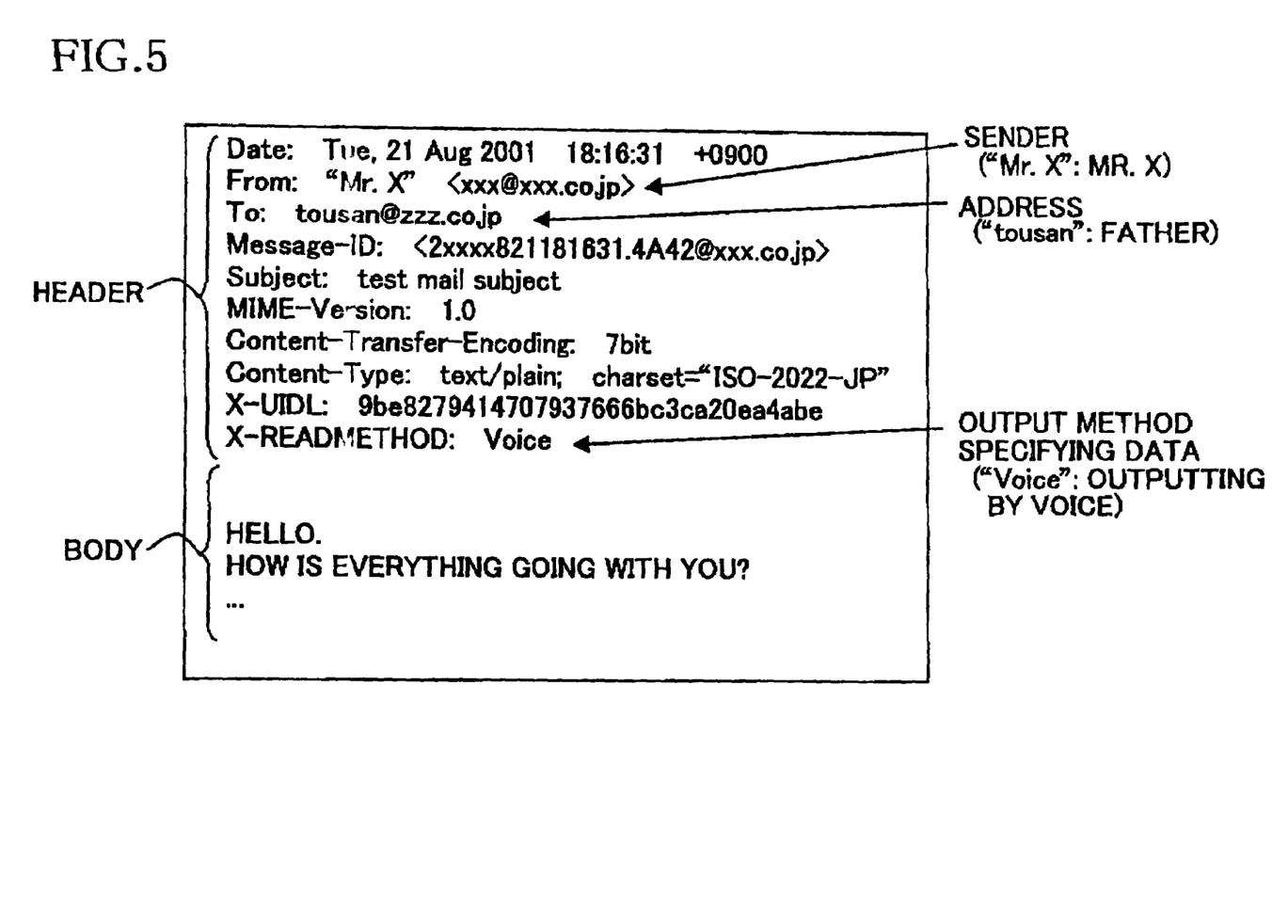
FIG. 5 is an explanatory diagram showing an example of a specific structure of electronic mail data.

Data to be transmitted as e-mail is generally constructed from a header and a body, as shown in FIG. 5. The above-described condition determination target is included in the header. For example, in FIG. 5, it is apparent that the sender is Mr. X as the header shows "From: "Mr. X"". The header also shows an address, "To: tousan@zzz.co.jp", so that it is apparent that the mail is addressed to the father. In addition, the header shows "X-ReadMethod: Voice" as the output method specifying data. This means that the e-mail message is specified by the sender to be outputted by voice at the receiving end.

The data applicable to the condition determination target is determined in the received e-mail message and the determined data is compared with the condition value. When the determined data matches the condition value, the e-mail message is outputted in the specified output method. For example, as shown in FIG. 4, when the address of the e-mail message is "tousan" (father), the e-mail message is displayed on the LCD 12. Priorities are assigned to the output conditions as described below. When an e-mail message is received, the output conditions are referred to in order of decreasing precedence. The order of the priorities can be arbitrarily determined by the user according to the output conditions.

The output timing, which can be arbitrarily specified according to the output conditions, can be specified as either of "on receiving" (i.e. the output is implemented upon receipt of an e-mail message.) or "on operated" (i.e. the output is implemented upon issue of a command to output an e-mail message by the user). The output password can be also assigned as necessary by the user according to the output conditions. The output method specifying data is arbitrarily added to the e-mail messages by the sending end, as described above. Therefore, as a matter of course, there may be an e-mail message, which does not include the output method specifying data.

When the condition data as shown in FIG. 4 is set, the condition information setting portion 21 stores the set condition data into the EEPROM 2a. When a mail receiving portion 23 receives an e-mail message from outside via the modem 11, the mail receiving portion 23 stores the e-mail message into the RAM 3c (more specifically, the applicable mail box in the RAM 3c) and inputs the e-mail message into an output condition determining portion 22. Then, the output condition determining portion 22 specifies the output method, comparing the received e-mail message with the condition data stored in the EEPROM 2a.

More particularly, the condition data shown in FIG. 4 is referred to in order of decreasing precedence. First, it is determined whether the received e-mail message includes output method specifying data (priority 1). For example, as shown in FIG. 4, when the e-mail message includes "Voice" as the output method specifying data, the voice synthesis LSI 8 is driven to output the e-mail messages by voice. When the e-mail message does not include the output method specifying data, it is determined whether the sender of the e-mail message is "kaisha" (a person who works at an office where the father works) (priority 2). When it is determined that the sender is "kaisha" (e.g., when "From: 'kaisha'" is indicated in the header, instead of "From: 'Mr. X'" shown in FIG. 5, as a sender) the printing unit 13 is driven to print out the e-mail message. When the sender is not "kaisha", it is determined whether the e-mail message is addressed to the father (priority 3). When the e-mail message is addressed to "tousan", the e-mail message is supposed to be displayed on the LCD 12. However, the output timing of the e-mail message is specified as "On operated", so that the output of the e-mail message is not implemented at this time and the processing is temporarily finished. The processing is suspended until the father himself directly performs an operation (issues a command to output the e-mail message) using the operation inputting portion 4.

When the e-mail message is not addressed to the father, it is determined whether the e-mail message is addressed to the mother (priority 4). When the e-mail address is "kaasan", the voice synthesis LSI 8 is supposed to be driven to output the e-mail message by voice. However, in this case the output password is assigned, so that an input of the output password is requested by the facsimile machine 1. Thus, the e-mail message is not outputted upon its receipt. In this embodiment, a request for the input of the output password is made by a voice message via the speaker 14 of the facsimile machine 1. The e-mail message is output by voice only after the valid output password is input by the user via the operation inputting portion 4.

When the e-mail message is not addressed to the mother, it is determined whether the e-mail message is addressed to the grandmother (priority 5). When the e-mail message is addressed to "baasan", the printing unit 13 is driven to print out the e-mail message. When the e-mail message is not addressed to the grandmother, it is determined whether the e-mail message is addressed to the son (priority 6). When the e-mail message is addressed to "musuko", the received e-mail message is input into a forwarding portion 25. The forwarding portion 25 forwards the e-mail message to a predetermined address ("zzz@zzz.ne.jp" as shown in FIG. 4 in this embodiment). The forwarding portion 25 corresponds to a forwarding unit of the invention.

When the e-mail message is not addressed to the son, the output condition assigned the lowest priority (priority 255) is applied. That is, when the e-mail message, which is not applicable to any of the priorities 1 to 6, is received, the e-mail message is not output upon its receipt and the processing is temporarily finished. The e-mail message is displayed on the LCD 12 when any of the users directly performs an operation (issues the command to output the e-mail message) using the operation inputting portion 4. Therefore, the e-mail message addressed to the daughter is applied with the priority 255, so that the e-mail message is not output unless the daughter or one of the others in the family directly performs an operation using the operation inputting portion 4.

When an e-mail message is addressed to a plurality of persons, the same e-mail message is stored in each person's mail box. At that time, the output condition determining portion 22 specifies the output methods according to the addresses. As to an e-mail message addressed to the plurality of persons, each of the addresses indicates the mail boxes and is used for comparison. That is, the address of the father's mail box is "tousan", and that of the mother's mail box is "kaasan". For example, when an e-mail message addressed to the mother and the grandmother is received, the output condition determination portion 22 compares the e-mail message with the output condition in order of the priority as described above with respect to both the mail box of the mother and that of the grandmother.

That is, as to the mother's mail box, the address of the e-mail message is compared based on the address of "kaasan" and the processing by the output condition determining portion 22 is performed. As a result this, the voice output method of priority 4 is specified. As to the grandmother's mail box, the address of the e-mail message is compared based on the address of "baasan" and similar processing is performed. As a result, the print output method of priority 5 is specified. As described above, when the e-mail message is addressed to a plurality of persons, the output methods are specified in accordance with the condition data set by addresses.

When it is desired to output a yet-to-be output e-mail message, because its output timing is specified as "On operated", or it is desired to output an already-output e-mail message again, although the message has been output once, the desired e-mail message can be output by the user directly performing an operation using the operation inputting portion 4. That is, when the user specifies the e-mail message desired to be output using the operation inputting portion 4, a mail specifying portion 24 inputs the specified e-mail message into the output condition determining portion 22 from the RAM 3c. Then, the output condition determining portion 22 performs the processing as described above to specify the output method, referring to the set condition data. Accordingly, the output method is specified in accordance with the condition data not only when the e-mail message is received but also when the user arbitrarily outputs the e-mail message.

Figure 6:
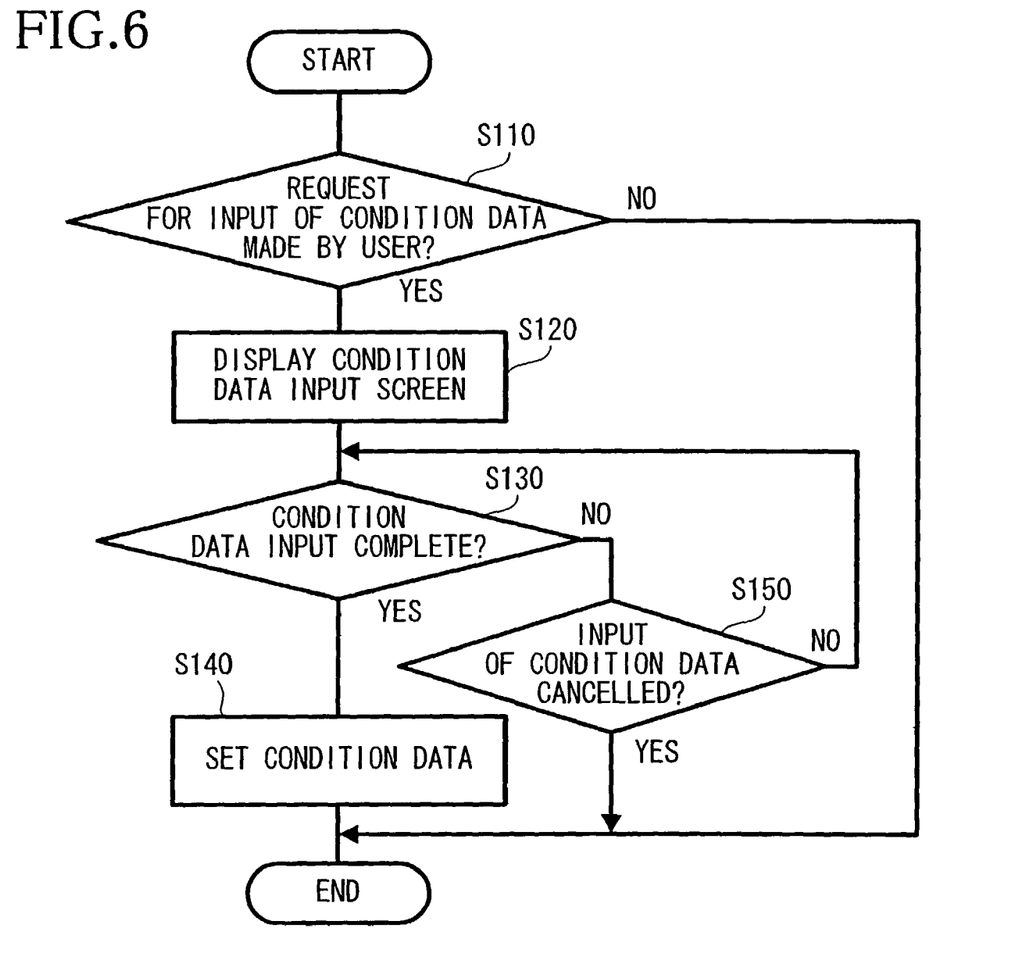
FIG. 6 is a flowchart of condition data setting processing to be executed as a part of the mail processing of the embodiment.
Figure 7:
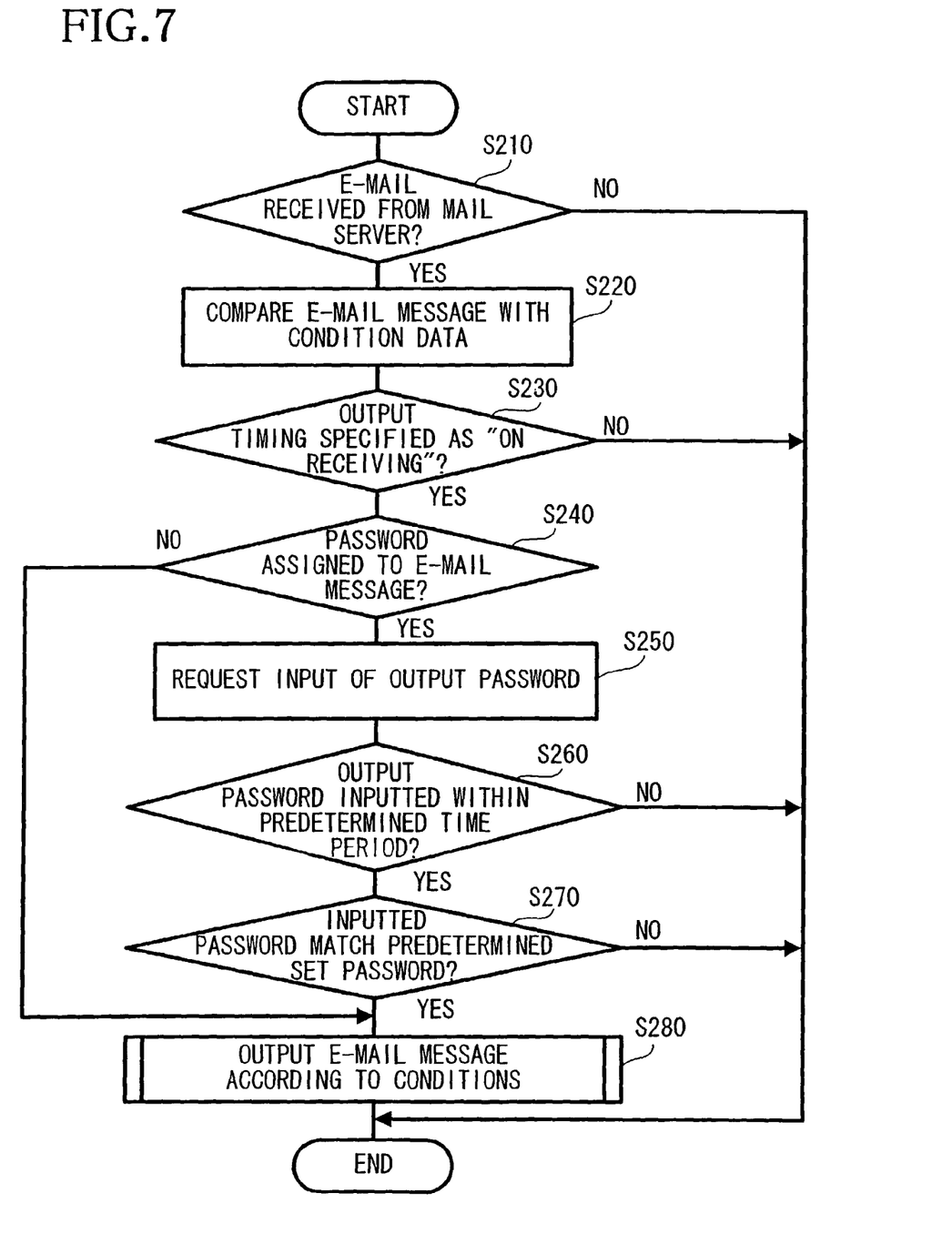
FIG. 7 is a flowchart of mail output control processing on receipt to be executed as a part of the mail processing of the embodiment.
Figure 8:
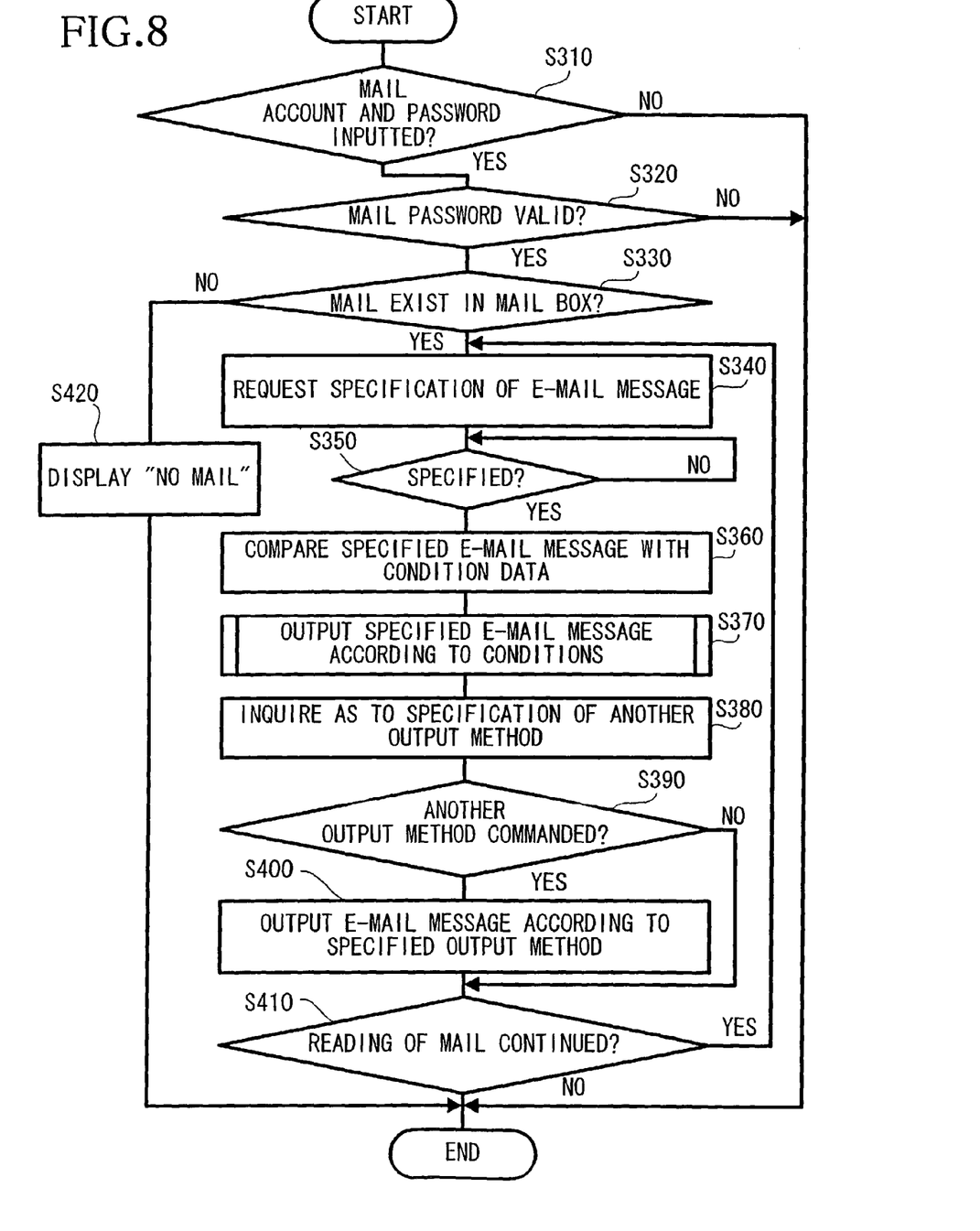
FIG. 8 is a flowchart of mail output control processing on operation to be executed as a part of the mail processing of the embodiment.

The mail processing is performed as shown in FIGS. 6 to 8. FIG. 6 shows a flowchart of the condition data setting processing. The CPU 3a reads a condition data setting processing program from the ROM 3b and performs the processing according to the program. The condition data setting processing is repeatedly implemented at predetermined intervals. In the flowchart shown in FIG. 6, a processing at Step 140 (hereinafter, S stands for a step) is a process to implement the function of the condition data setting portion 21 (that is, an output condition setting unit of the invention).

When the condition data setting processing starts, first, at S110, it is determined whether input of condition data is requested by the user. The user can request the input of the condition data by operating the operation inputting portion 4 when the user desires to newly input or change the set condition data. When the request is not made by the user (S110: NO), the processing is finished. When the request is made by the user (S110:YES), flow moves to S120. At S120, a condition data input screen appears on the LCD 12. Thus, the user is allowed to input requirements (condition data) in accordance with the condition data input screen displayed on the LCD 12.

After that, flow moves to S130 and it is determined whether the input of the condition data by the user is complete. When it is determined that the input is complete (for example, when the user pressed a complete switch (not shown)) (S130:YES), flow moves to S140 and the input condition data is set. That is, in accordance with the newly input condition data, the condition data, which has been set, is updated. Thus, the newly input condition data is included in the set condition data and stored in the EEPROM 2a.

When a negative determination is made at S130 (S130:NO) because the user is in the middle of inputting the condition data, flow moves to S150. At S150, it is determined whether the input of the condition data is cancelled. The input cancellation is made by pressing an input cancellation button (not shown), for example, when the user determines that it is unnecessary to change the condition data although the condition data input screen is displayed. When the input of the condition data is cancelled at this point (S150:YES), the condition data input screen disappears and then the processing is finished. When the input of the condition data is not cancelled (S150:YES), flow goes back to S130.

FIG. 7 shows a flowchart of the e-mail output control processing on receipt. The CPU 3a reads a program for the e-mail output control processing on receipt from the ROM 3b and performs the processing according to the program. The e-mail output control processing on receipt is repeatedly implemented at predetermined intervals by the mail boxes. In the flowchart shown in FIG. 7, processing at S220 to S280 are processes that implement the function of the output condition determining portion 22. The processing at S220 is performed by an output method specifying unit of the invention, and the processing at S230 to S280 is performed by an output control unit of the invention.

When the mail output control processing on receipt starts, first, at S210, it is determined whether an e-mail message has been received from the mail server 16. In the embodiment, when the mail, server 16 receives an e-mail message, the e-mail message is automatically transmitted to the facsimile machine 1 from the mail server 16. Therefore, it is unnecessary for the user to ask the mail server 16 whether there is an e-mail message in the mail server 16.

Thus, when no e-mail message has been transmitted from the mail server 16 to the facsimile machine 1 (S210:NO), the processing is finished. When an e-mail has been transmitted from the mail server 16 to the facsimile machine 1 (S210: YES), flow moves to S220 and data (target item) included in the received e-mail message is compared with the condition data set in the facsimile machine 1 (see FIG. 4). That is, the comparison is performed in order of the priority as described above to determine which output condition matches the e-mail message. For example, when the e-mail message is addressed to the mother, but the sender is not "kaisha" and the e-mail message does not include the output method specifying data (hereinafter, this example is referred to as a mother's case), the e-mail message matches the condition of priority 4.

Then, flow moves to S230 and it is determined which output timing is specified with respect to the received e-mail message. When the output timing is specified as "On receiving" (i.e. the output is implemented upon receipt of the e-mail message) (S230:YES), flow moves to S240. When the output timing is specified as "On operated" (S230:NO), the processing is finished. Accordingly, in the above-described mother's case, flow moves to S240 since the output timing is specified as "On receiving".

At S240, it is determined whether an output password is assigned with respect to the received e-mail message. When the output password is not assigned (S240:NO), flow moves to S280. When the output password is assigned (S240:YES), flow moves to S250 and the input of the output password is requested by voice from the user. Then, at S260, it is determined whether the output password has been input within a predetermined time period. When the output password has been input (S260:YES), flow moves to S270. When the output password has not been input (S260:NO), it is determined that the user is not present near the facsimile machine 1, and the processing is finished without the e-mail message being output. For example, in the mother's case, "1234" has been assigned with respect to the e-mail message as the output password, so that an affirmative determination is made at S240, and then flow moves to S250. At S250, the input of the output password is requested.

When a password is inputted in response to the request (S260:YES), at S270, the input output password is verified against the assigned output password. That is, it is determined whether the input output password matches "1234" of the predetermined output password. When the input output password does not match the assigned output password (S270: NO), the processing is finished. When the input output password matches the assigned output password (S270:YES), flow moves to S280.

At S280, the e-mail message is actually output in the specified output method according to the output condition. More particularly, in the mother's case, the "Voice" is specified as the output method, so that the received e-mail message is input into the voice synthesis LSI 8 to convert it into voice signals. As a result, the converted voice signals are output to the speaker 14 and thus the e-mail message is output by voice.

That is, in the mail output control processing on receipt, when an e-mail message is received, the e-mail message is compared with set condition data to specify an output method. When the e-mail message is actually output, it is determined whether the output timing and output password are specified as condition data. When the output timing of the e-mail message is specified as "On receiving", the e-mail message is output at once unless there is a password condition. However, if the output timing of the e-mail message is specified as "On operated", the e-mail message is not output in this processing. Further, when the output password is assigned with respect to the e-mail message, even though the output timing of the e-mail message is specified as "On receiving", first, the input of the output password is requested. With the assignment of the output password, the e-mail message is output only when the valid output password is input.

FIG. 8 shows a flowchart of the e-mail output control processing on operation. The CPU 3a reads a program for the e-mail output control processing on operated and performs the processing according to the program. This e-mail output control processing on operation is repeatedly implemented at predetermined intervals. In the flowchart shown in FIG. 8, processing at S360 and S370 are processes that implement the functions of the output condition determining portion 22. The processing at S360 is performed by the output method specifying unit of the invention, and the processing at S370 is performed by the output control unit of the invention.

When the mail output control processing on operation starts, first, at S310, it is determined whether an e-mail, hereinafter, a mail, account and an e-mail, hereinafter a mail, password have been inputted. When the user desires to output an e-mail message addressed to him/herself arbitrarily, the user inputs his/her mail account and mail password via the operation inputting portion 4. For example, when father desires to output e-mail messages addressed to him, he needs to input his mail account (e.g. tousan) and mail password. The mail password is registered in the provider in advance so that the provider can authenticate the user. The above-described output password and the mail password are different from each other. However, at S310, the mail password is only used in the facsimile machine 1 to output received e-mail messages by operation by the user, but is not transmitted to the provider to authenticate the user.

When the mail account and mail password has been input (S310:YES), the input mail password is verified (that is, whether the input mail password is the valid mail password for the input mail account) at S320. When the input mail password is not valid (S320:NO), the processing is finished. When the input mail password is valid (S320:YES), flow moves to S330.

At S330, it is determined whether there is an e-mail message corresponding to the input mail account in the e-mail messages stored in each mail box. When there is no corresponding e-mail message (S330:NO), a message of, for example, "No mail", is displayed on the LCD 12 at S420 and the processing is finished. When there are e-mail messages (S330:YES), flow moves to S340. At S340, a list of the e-mail messages (e.g. a list showing senders, subjects and sending dates and time) is displayed on the LCD 12 and a request is made to specify an e-mail message desired to be output. For example, when the father inputs his mail account and password to output e-mail messages addressed to him, a list of the e-mail messages is displayed on the LCD 12 if there are e-mail messages in the father's mail box and then a request is made to specify the e-mail message desired to be output. If there is no e-mail message in the father's mail box, the message of, for example, "No mail", is displayed on the LCD 12.

Then, at S350, it is determined whether any one of the e-mail messages is specified by the user. When it is determined that one of the e-mail messages is specified (S350: YES), flow moves to S360 and the specified e-mail message is compared with the set condition data. Next, at S370, the e-mail message is output in the specified method according to the set output condition. The processing at S360 and S370 is similar to that at S220 and S280, respectively.

After the e-mail message is outputted at S370, an inquiry is made to the user whether the e-mail message is to be output in another output method. For example, there may be a case where the father desires outputting an e-mail message addressed to him in another output method, depending on the contents of the e-mail message, although the condition data is specified such that the e-mail message is displayed on the LCD 12 when the father outputs the e-mail message addressed to him. Therefore, the inquiry is made after the output is completed (according to the predetermined condition data) at S370.

After the inquiry is made at S380, it is determined whether a request for outputting the e-mail message in the other method is made by the user at S390. When the request is not made by the user (S390:NO), flow moves to S410. When the request is made by the user (S390:YES), flow moves to S400 and the e-mail message is output in the method that is specified by the user. Then, at S410, an inquiry is made whether other mail messages are to be read continuously, that is, whether it is desired to output the other e-mail messages listed at S340. When a request of continuously reading the e-mail messages is made by the user (S410:YES), flow goes back to S340. When no such a request is made by the user (S410:NO), the processing is finished.

According to the facsimile machine 1 of the above-described embodiment, an output method for an e-mail message can be specified on a user-by-user (an address-by-address) basis by which, for example, the user inputs condition data in advance as shown in FIG. 4. Therefore, the user can output the e-mail message in a desired output method without specifying the output method every time the user receives e-mail messages.

Further, the output method can be specified as a condition of the condition data not only on the address-by-address basis but also on a sender-by-sender basis. Accordingly, the output method can be further minutely specified. For example, an e-mail message from an important person is to be output by printing, that from a person having a casual relationship is to be output by voice, and that from the others is to be output on the LCD 12. Thus, the output can be further effectively implemented. Furthermore, it can be designed such that the output method is specified in accordance with the output method specifying data specified by the sender. Therefore, the e-mail message can be output in an appropriate method that is intended by the author (sender) of the e-mail message. For example, when the sender of the e-mail message specifies output method specifying data to the e-mail message so that the e-mail message is printed out at the receiving end, at the time of creating the e-mail message, the e-mail message is output in the output method specified by the sender at the receiving end. As a result, the e-mail message is output in an appropriate method for the recipient.

In the embodiment, not only the output method, but also the output timing and output password, can be specified in accordance with the e-mail messages. Accordingly, the facsimile machine 1 can be provided that includes the e-mail receiving/outputting function having excellent usability.

Various output conditions are conceivable that can be set by the condition data setting portion 21. The facsimile machine 1 is designed such that an output method for outputting a received e-mail mail can be specified in accordance with an address of the received e-mail message. For example, in a case where a married couple shares the facsimile machine 1 at home, it can be set such that an e-mail message addressed to the husband is displayed on the LCD 12 and an e-mail message addressed to the wife is output by voice. Therefore, an appropriate output method can be specified in detail on a user-by-user basis.

In the facsimile machine 1, the condition data setting portion 21 can specify the output method for outputting the e-mail message according to at least an address of the received e-mail message. For example, in the above-described sharing example, it can be set such that an e-mail message, transmitted from a person who works at the office where the husband works, is output by voice even though the e-mail message is addressed to the husband, because the e-mail message may include urgent matters. Accordingly, an appropriate output method can be specified in detail on a user-by-user basis.

In the facsimile machine 1, when an e-mail message including output method specifying data, that specifies the output method for the e-mail message is received, the condition setting portion 21 can set a condition whether an output according to the output method specifying data is performed, as the output condition. That is, the output method depends on the output method specifying data (which is specified by a sender and transmitted as, for example, header data of the e-mail message) included in the received e-mail message.

With setting such a condition, for example, if a sender transmits an e-mail message, adding the output method specifying data that specifies an output method to print out the e-mail message at a receiving end with consideration given to the lengthy message, the e-mail message is printed out at the receiving end based on the output method specifying data. As a result, the e-mail message is output in the method most appropriate for the receiving end. For instance, when a user transmits an e-mail message to an address of the user's home from a place where the user is, the user can specify the output method as required. When the user transmits an e-mail message to the user's family at midnight, the user can specify the output method to print out the e-mail message, but not to output it by voice, because the user's family may be in bed. Thus, an appropriate output method can be specified in detail on a user-by-user basis.

An output timing, whether an e-mail message is automatically outputted upon receipt of the e-mail message or outputted only when the user instructs the performance of an output of the e-mail message, of each e-mail message is different by e-mail messages, according to various conditions, such as needs or preferences of the user or desirable output methods.

In the facsimile machine 1, the condition data setting portion 21 can add an output timing of the received electronic mail message according to the output condition. It is determined whether the output timing is specified by the condition data setting portion 21 as the output condition corresponding to the received electronic mail message. When it is determined that the output timing is specified, the output is performed according to the specified output timing.

That is, when the e-mail message is output in the output method according to the output condition, it is determined whether an output timing is further specified to the e-mail message. As a result, when the output timing is specified, the output is performed according to the specified output timing. For example, it is specified as an output condition that an e-mail message from a sender A is output by voice, and in addition to this output condition, it is specified that the output is performed upon receipt of the e-mail message. With this specification, the e-mail message from the sender A can be output by voice upon its receipt.

According to the facsimile machine 1, the received e-mail can be output according to user requests (e.g. output methods and output timing). Therefore, the usability of the facsimile machine 1 is further improved.

For example, when a user is not near the facsimile machine 1 though it is specified that an e-mail message is output by voice upon its receipt, the e-mail message can be output by voice when the user is present. According to the facsimile machine 1, the condition data setting portion 21 can assign an output password according to the output conditions. When the output password is assigned to the received e-mail message, an input of the output password is requested. After the password is input, it is determined whether the input output password matches the output password assigned by the condition data setting portion 21. When the input output password matches the assigned output password, the output is performed in the specified output method.

That is, by requesting the input of the output password before outputting the e-mail message, it is determined whether the user is near the facsimile machine 1. By doing so, it is prevented that the voice output of the e-mail message is performed without the user being near the facsimile machine 1. Further, if the user keeps his/her output password secret, an e-mail message addressed to the user can be prevented from being output by others. Accordingly, it is effective in terms of privacy protection.

According to the facsimile machine 1, the user can specify desirable output methods, selecting from the display method, voice output method, printing method, and transfer method. Therefore, the facsimile machine having excellent usability is obtained. Particularly, it is conceivable that user requests for output methods will vary when a plurality of users share a facsimile machine. In such a case, the facsimile machine 1 of the invention is effectively used by the plurality of users.

Although the invention has been described in detail and with reference to a specific embodiment thereof, it would be apparent to those skilled in the art that various changes, arrangements and modifications may be applied therein without departing from the spirit and scope of the invention.

For example, in the above-described embodiment, the example of the condition data is shown in FIG. 4. It is needless to say that the condition data shown in FIG. 4 is only one of examples. The user can freely set the condition data such that other objects are set as the condition determination target or the number of types of the condition values are increased.

As to the output method of the e-mail message, the four types of output methods (displaying a message on the LCD 12, outputting a message by voice, printing out a message, and transferring a message to a predetermined address) are described above. The voice output function is not necessarily required if the user does not need the function. Further, the above-described output methods are not always required. The facsimile machine 1 should employ only those output methods required by the user. For example, in the sharing case described above, it would be convenient if it is specified that e-mail messages addressed to the husband are transferred to an address specified in advance (e.g. a cellular phone) when he is on the business trip.

In the above-described embodiment, the e-mail receiving device of the invention is applied to a facsimile machine. The facsimile machine generally has a function of printing a received image data on a sheet as a basic function. Therefore, like this embodiment, with application of the e-mail receiving device to the facsimile machine, the printing function originally provided to the facsimile machine can be used when an e-mail message is output. Thus, the e-mail receiving device can be further effectively implemented and a facsimile machine having a higher performance (that is, having the e-mail receiving device of the invention) can be obtained.

However, it is not limited to the facsimile machine, but it can be applied to other devices, for example, telephone devices, set-top boxes, and personal computers, that can transmit and receive e-mail with the external network through various communication lines and include at least two output methods for outputting received e-mail messages.

What is claimed is:

1. An electronic mail receiving device that receives an electronic mail message transmitted to an address specified by a sender, via a communication line, and can output the received electronic mail message by at least two output units, comprising:
    an output condition setting unit that sets an output condition to specify one of the output units, which output the received electronic mail message, in accordance with a command entered from outside;
    an output method specifying unit that determines whether the received electronic mail data includes data corresponding to the output condition, and specifies the output unit, which outputs the electronic mail message, according to the output condition, when the electronic mail message includes the data corresponding to the output condition; and
    an output control unit that outputs the received electronic mail message by the output unit specified by the output method specifying unit.

2. The electronic mail message receiving device according to claim 1, wherein the output method specifying unit can specify the output unit, which outputs the electronic mail message, in accordance with, at least, an address of the received electronic mail message.

3. The electronic mail message receiving device according to claim 1, wherein the output method specifying unit can specify the output unit, which outputs the electronic mail message, in accordance with, at least, a sender of the received electronic mail message.

4. The electronic mail message receiving device according to claim 1, wherein the electronic mail message can include specifying data that specifies the output unit to be used for the output, and the output condition setting unit can set a condition whether the output of the electronic mail message is performed by the output unit specified by the specifying data, as the output condition, at least when the electronic mail message that includes the specifying data is received.

5. The electronic mail message receiving device according to claim 1, wherein the output condition setting unit can add an output timing of the received electronic mail message according to the output condition, and the output control unit determines whether the output timing is specified by the output condition setting unit as the output condition corresponding to the received electronic mail message and operates the specified output unit according to the specified output timing when the output timing is specified.

6. The electronic mail message receiving device according to claim 1, wherein the output condition setting unit can assign a password according to the output condition, and the output control unit requests an input of the password from outside and determines whether the input password matches the password assigned by the output condition setting unit when the password is assigned to the received electronic mail message by the output condition setting unit, and operates the specified output unit when the input password matches the assigned password.

7. The electronic mail message receiving device according to claim 1, wherein the output units comprise at least two of a voice output unit that outputs the electronic mail message by voice, a printing unit that prints out the electronic mail message, and a forwarding unit that forwards the electronic mail message to a forwarding address which is specified in advance.

8. A facsimile machine connected with an external network via a communication line, comprising:
- a receiving unit that receives image data transmitted from the external network;
- a printing unit that prints out the image received by the receiving unit;
- an image scanning unit that scans an image as image data;
- a transmitting unit that transmits the image scanned by the image scanning unit to the external network; and
- the electronic mail receiving device claimed in claim 1.

9. An electronic mail (e-mail) receiving device, comprising:
- an operation input portion;
- a display;
- a controller having:
  - a processor for executing programs;
  - a first storage device storing programs for execution;
  - a second storage device storing data for use with or produced by the programs in the first storage device;
  - a third storage device storing an output control scheme; and
- a display unit;
- a printing unit; and
- a connection to a external connection line, wherein the controller controls operation of all elements in accordance with programs in the first storage unit and the output control scheme includes discrimination based on information included in the e-mail and a plurality of output instructions associated with the discrimination.

10. The e-mail receiving device according to claim 9, wherein the plurality of output instructions include an output method.

11. The e-mail receiving device according to claim 10, wherein the plurality of output instructions include a time of output selected from one of immediately upon receipt and upon input instructions.

12. The e-mail receiving device according to claim 10, wherein the plurality of output instructions include a password.

13. The e-mail receiving device according to claim 12, wherein the password is one of an all numeric character set, an all alphabetic character set, or a combination thereof.

14. The e-mail receiving device according to claim 10, wherein the discrimination is based on one of an address and a sender of the e-mail.

15. The e-mail receiving device according to claim 10, further comprising:
- a voice synthesis unit; and
- a speaker device, wherein the output method includes printing, displaying on the display, outputting by voice, and forwarding to a second address.

16. The e-mail receiving device according to claim 10, wherein the plurality of user output instructions further comprise a condition determination target allowing a sender to specify the output method.

17. A method of using an electronic device having at least two output units from a group comprising a display, a printing unit, a message forwarding unit, and a voice output unit, for receiving and outputting electronic mail (e-mail) for a plurality of users, comprising:
- inputting condition data, at least one set of condition data applicable to each user and each set of condition data having a priority designator;
- receiving an e-mail;
- comparing the e-mail to the condition data in a priority order; and
- processing the e-mail to be output through one of the at least two output units in accordance with the condition data.

18. The method according to claim 17, further comprising determining whether password data is among the condition data.

19. The method according to claim 18, wherein when password data is part of the condition data, further comprising inputting the password prior to execution of other condition data.

20. The method according to claim 17, further comprising determining whether an incoming message includes output instructions.

* * * * *